United States Patent [19]

Luttinger et al.

[11] 4,089,837

[45] May 16, 1978

[54] SHELL MOLDING PROCESS AND COMPOSITION

[75] Inventors: Manfred Luttinger, Columbus; George E. Cremeans, Grove Port; Louis J. Nowacki, Columbus, all of Ohio

[73] Assignees: Manley Bros. of Indiana, Inc., Chesterton, Ind.; Borden, Inc., Columbus, Ohio ; a part interest to each

[21] Appl. No.: 775,247

[22] Filed: Mar. 7, 1977

[51] Int. Cl.² .............................................. C08K 3/36
[52] U.S. Cl. .................................... 260/38; 260/59 R
[58] Field of Search .............. 260/38, 58, 59, DIG. 40

[56] References Cited

U.S. PATENT DOCUMENTS

| 2,414,416 | 1/1947 | Rhodes | 260/59 X |
|---|---|---|---|
| 2,599,870 | 6/1952 | Sigtermans | 260/59 X |
| 2,806,832 | 9/1957 | Drumm et al. | 260/38 |
| 3,118,850 | 1/1964 | Cooper | 260/38 |
| 3,422,068 | 1/1969 | Kreibich et al. | 260/59 X |

*Primary Examiner*—Sandra M. Person
*Attorney, Agent, or Firm*—Edward D. Gilhooly

[57] ABSTRACT

Shell cores and molds are prepared more rapidly by the shell process using resin coated sands wherein the resin is a phenol-formaldehyde novalak resin but having a small amount, e.g. about 1 to about 10 percent by weight, of resorcinol incorporated therein whereby a significant reduction in the cycle time required to produce the cores or molds is achieved.

12 Claims, No Drawings

SHELL MOLDING PROCESS AND COMPOSITION

BACKGROUND OF THE INVENTION

1. Field of the Invention

This invention relates to compositions for use in the preparation of shell cores and molds, and more particularly, to the preparation of sand precoated with resinous binding agent, particularly adapted for use in the shell process.

2. The Prior Art

Shell cores and molds are used in the casting of metals, and the processes for making them are well known. As an example, the molds are formed from mated sections composed of thin "shells" of sand bonded with a thermoset resin product. The shells generally have a wall thickness of about 0.1 to about 0.5 or more inches.

The individual shell sections are prepared using a mixture of sand and a phenol-formaldehyde novalak resin. These shell molding compositions are referred to in the art as "coated sands" since the mixture of sand and phenol-formaldehyde novalak resin is present in the form of a coating on the individual grains of sand.

Phenol-formaldehyde novalak resins are fusible thermoplastic resins which are prepared by the condensation reaction of phenol with a less than stoichiometric amount of formaldehyde. The resin is converted into an insoluble, cross-linked resinous product upon the addition to the resin, of a methylene generating agent in an amount sufficient to compensate for the stoichiometric deficiency of formaldehyde originally used in the condensation reaction to prepare the resin.

In preparing shell mold sections in accordance with the shell mold process, a large excess of resin coated sand is brought into contact with a metal pattern preheated to a temperature in the range of from 400° to 700° F. The resin adjacent the heated pattern softens under the heat and flows around the sand grains to form a lightly adherent shell on the pattern. The time of contact and the temperature of the pattern determines the thickness of the shell with a given resin coated sand. After a shell of the desired thickness has had time to build up or "invest" in the pattern and conform to the contour thereof, the excess non-adherent resin coated sand is removed from the pattern, and the pattern and adherent shell are then baked at an elevated temperature, e.g. 400° to 700° F in order to advance the novalak resin to its final hardness to form a rigid, self-sustaining thermoset article or shell mold conforming to the shape of the metal pattern. Finally, the hardened shell is stripped from the pattern preparatory to assembly and metal casting operations.

The increasing emphasis on atuomted manufacturing techniques has occasioned modernization of foundry facilities and practices whereby many types of sand molds and cores are now made in large quantities on automated machinery. A limiting factor on the rate at which sand molds and cores can be produced with modern automated foundry machinery has been the length of the investment and cure cycles of the binding agents utilized to adhere the sand particles together. Generally, the time for investment to occur as well as the time to finalize the curing of the binding agent in order to achieve the requisite strength of the mold or core is too slow to achieve optimum utilization of foundry equipment. Too slow cycle time characteristics of the binding agents heretofore used detract from efficient foundry operation and therefore the industry is in a continuous search for thermosetting binder resins which have cycle time characteristics substantially more rapid than other resinous binders heretofore known.

SUMMARY OF THE INVENTION

In accordance with the practice of the present invention, there is provided a resin coated sand composition suitable for use in the manufacture of shell cores and molds by the shell process, the composition being prepared from a mixture of sand, a phenol-formaldehyde novalak resin, a curing agent to render the resin thermosetting and a small but effective amount of resorcinol which serves to accelerate curing of the resin.

Shell cores and molds are easily and rapidly prepared from the compositions of the present invention. By using the sand composition of the present invention in the manufacture of cores and molds by the shell process, the time for investment of the sand core or mold as well as the time to effect final curing of the core or mold is substantially reduced when compared to cores and molds prepared using novalak resin coated sands in which resorcinol is absent from the resin coated sand. In addition, it has been determined that shell cores and molds made by the shell process with the novalak resin coated sands of the present invention generally exhibit greater resistance to peel back when compared to cores and molds manufactured with novalak resin coated sands outside the scope of the invention. Furthermore, the temperature at which the shell process can be carried out can be reduced with attendant energy savings by use of this invention.

In preparing compositions in accordance with the present invention, any foundry sand which is suitable for the shell process may be used, although mixing time and resin requirements will generally vary somewhat from sand to sand.

The phenol-formaldehyde novalak resins used to prepare the resin coated sand compositions of the present invention are well known to the art and may be any phenol-formaldehyde novalak resin material conventionally used to prepare resin coated sand in the manufacture of shell cores and molds as for example phenol-formaldehyde novalak resins described in U.S. Pat. Nos. 3,878,159, 3,838,095, 3,692,733, 3,663,486 and 3,632,785. Other prior art patents that are of general interest are U.S. Pat. Nos. 1,802,390, 1,889,751, Re. 26,881, 3,652,060, 3,709,849, Re. 25,661, 2,736,718, 3,020,254 and British Pat. specification No. 160,258 (1929).

Phenol-formaldehyde novalak resins are generally prepared by the condensation of phenol with formaldehyde in the presence of an acid catalyst wherein the formaldehyde is present in the reaction mixture in less than stoichiometric amounts and generally at a mole ratio of phenol to formaldehyde of about 1:0.4 to 1:0.9. Acids useful as catalysts in the preparation of the novalak resins include mineral acids such as hydrochloric acid and sulfuric acid, organic acids such as sulfonic acids such a p-toluene sulfonic acid and phenol sulfonic acid and carboxylic acids such as oxalic and maleic acids.

In preparing the novalak resins, the acid catalyst is added to the reaction medium containing the phenol and formaldehyde reactants in a concentration of about 0.1 to 5.0 percent based on the weight of the phenol. The reactants are then heated to a temperature in the range of 80° to 160° C until the content of free formaldehyde in the reaction medium reaches values of less than 3 percent by weight, indicating that the reactin is substantially complete. Water in the resulting reaction product is then removed.

To convert the phenol-formaldehyde novalak resin into the thermoset state, a curing agent, such as formaldehyde, paraformaldehyde and hexamethylenetetramine is added to the resin. The curing agent most commonly used to convert phenol-formaldehyde novalak resins to the thermoset state is hexamethylenetetramine and this agent may be used in the practice of the present invention.

DESCRIPTION OF THE PREFERRED EMBODIMENTS

In preparing the resin coated sand compositions of the present invention, the phenol-formaldehyde resin which is used to coat the sand particles is generally added to the sand particles at a concentration of about 1 to about 8 percent by weight, based on the weight of the sand, and preferably about 2 to about 5 percent by weight, based on the weight of the sand.

An amount of curing agent suitable to convert the phenol-formaldehyde novalak into the thermoset state is from about 5 percent to about 22 percent by weight of the resin.

An amount of resorcinol sufficient to effect an acceleration in the curing of the phenol-formaldehyde novalak resin is added to the sand-resin mixture at a concentration of about 1 to about 10 percent by weight based on the solids weight of the resin and preferably at a concentration of about 2½/2 to about 8 percent by weight based on the solids weight of the resin.

In accordance with this invention, it is essential that resorcinol is incorporated in the phenol-formaldehyde resin binder at a concentration of about 1 to about 10 percent by weight based on the solids weight of the resin. The presence of about 1 to 10 percent resorcinol substantially decreases the cycle of time for providing a shell mold or core. Although concentrations of less than about 1 percent by solids weight of the resin are effective in decreasing the cycle time, the decrease in cycle time effected by such conconcetrations of resorcinol is of no practical importance to the shell process. Although concentrations of resorcinol in excess of about 10 percent by solids weight of the resin can be used, the decrease in cycle time occasioned by such concentrations in commercial practice usually does not justify the cost of the increased amount of resorcinol and may adversely affect the desirable properties of the resin coated sand.

Observations in the use of the resin coated sand composition of this invention have shown that improved resistance to peel back occurs. In addition using the resin coated sand composition of this invention enables the use of lower temperatures than conventionally used in the shell process and enables a reduction in the energy consumption requirements for the shell process.

The resorcinol can be added to the binder by the direct addition to a resin melt or solution of the phenol-formaldehyde novalak resin immediately after preparation of the resin. Alternatively, the resorcinol can be employed in combination with the curing agent added to the sand-novalak mixture, or as a separate additive to the resin coated sand during the mixing process.

The preparation of resin coated sands from an admixture of sand, phenol-formaldehyde novalak resin binder, curing agent and resorcinol can be made in any one of a number of well known foundry sand mixers or "mullers" such as a Barber Greene, a Simpson or a Beardsley Piper mixer which provides a substantially homogeneous mixture in a matter of a few mintues.

In accordance with the practice of the present invention, a measured quantity of a substantially dry foundry sand preheated to a given temperature, generally 250° to 350° F, is first introduced into a suitable foundry sand mixer to which is also added a measured quantity of the phenol-formaldehyde novalak resin and resorcinol, and the materials are mixed together for a period of 1 to 2 minutes, depending upon the efficiency of the mixer, to effect coating of the sand particles with the resin and resorcinol. An appropriate measured quantity of the curing agent, dissolved in water, is added to the resin coated sand mixture and a measured quantity of water, generally in an amount of about 1 to about 3 percent by weight, based on the weight of the sand, is added to the resin coated sand mixture to arrest further curing of the resin. The water contacted resin coated sand mixture is then mulled for a period of about 1.5 to 3 minutes until the tacky resin coated sand mixture becomes free-flowing. At this point, the mulling may be terminated and the mixture allowed to cool to room temperature to obtain a free-flowing composition. The mixture of resin, curing agent and resorcinol is present as a coating on the individual grains of sand.

If desired, other conventional additives such as lubricants can be incorporated in the materials charged to the muller to prepare the resin coated sand compositions of the present invention. Examples of suitable lubricants include metal stearates such as calcium stearate, lithium stearate and zinc stearate.

Shell cores and molds are prepared from the resin coated sand compositions of the present invention by conventional methods used in the shell process. For example, when preparing shell molds using the resin coated sand compositions of the present invention, an excess of the resin coated sand composition is deposited onto the surface of a metal pattern heated to a temperature of 250° to 700° F to bring the sand into contact with the pattern. After a shell of the desired thickness has had time to build up (invest), the pattern is inverted so that the excess of the resin coated sand is removed from the pattern. The shell is then baked at about 250° to about 700° F until it is sufficiently hard, strong or rigid to be stripped or removed from the pattern, generally a time period of 30 to 60 seconds.

The following examples are given in illustration and are not intended as limitations on the scope of this invention.

EXAMPLE I

Resin coated sand of the invention was prepared in a 100 pound capacity Simpson Mix-Muller as follows:

One hundred pounds of 70 AFS fineness silica sand was preheated to 300° F and added to the muller. Then 3.45 pounds (solids weight) of a commercially available phenol-formaldehyde novalak resin and 0.20 pounds resorcinol were added and mulling was continued for 90 seconds to coat the resin onto the sand. To the resin coated sand was added 1.65 pounds of an aqueous solution containing 33.3 percent hexamethylenetetramine followed by adding 0.70 pounds of water. Mulling and cooling were continued until the coated sand became a free-flowing material. The free-flowing coated sand was discharged from the muller and designated as "Coated Sand I".

A second resin coated sand was prepared in the same manner except that no resorcinol was added. This sand was designated as "Control Sand". This resin coated sand is not an example of the invention, but is presented for comparison purposes.

The cold tensile and hot tensile strengths of each of the resin coated sands were determined as follows:

The hot tensile strengths were determined by use of a Dietert No. 365 Hot Shell Tensile Tester. Tests were run at 1 and 4 minute cure times at 450° F.

The cold tensile strengths were determined by making 174 inch thick dog bone test briquets in a Dietert 363 Heated Shell curing Accessory. The test briquets were cured for 2 minutes at 450° F. and allowed to cool to room temperature. The cold tensile strength of the briquets was then determined by using a Dietert No. 401 Universal Sand Strength Tester in the manner set forth by the American Foundrymen's Society. The results of these tests are recorded in Table I below:

TABLE I

| Sand Type | Tensile Properties (psi) | | |
|---|---|---|---|
| | Cold | Hot | |
| | (2 min.) | (1 min.) | (4 min.) |
| Coated Sand I | 520 | 125 | 425 |
| Control Sand | 525 | 105 | 395 |

To demonstrate the improved molding results using resin coated sands of the present invention, a quantity of the Coated Sand I was deposited onto a heated platen of the type used to prepare shell molds by the shell molding process. The surface temperature of the platen was 450° F. The Coated Sand I was allowed to invest to a uniform thickness of ¼ inch whereupon the platen was inverted, and the excess Coated Sand I was allowed to run off. The time for investment was noted and recorded. Heating of the platen at 450° F was continued until the invested Coated Sand I had hardened to a degree that the shell mold was of sufficient strength such that it could be removed from the heated platen without breaking or warping. The time to effect curing of the shell was noted and recorded.

For purposes of comparison, the shell molding procedure described immediately above was repeated with the exception that the Control Sand was used instead of Coated Sand I.

The investment and curing times recorded for Coated Sand I and the Control Sand are listed in Table II below:

TABLE II

| Sand Type | Invest Time (Seconds) | Curing Time (Seconds) |
|---|---|---|
| Coated Sand I | 18 | 53 |
| Control Sand | 20 | 70 |

The data in Table II demonstrates that when employing resin coated sand of the present invention in the shell molding process, the invest time can be reduced by 2 seconds, or 10 percent, as compared with the Control Sand.

Similarly, the data in Table II demonstrates that when employing resin coated sand of the present invention in the shell molding process, the curing time can be reduced by 17 seconds or 24.3% as compared with the Control Sand. Accordingly, the total cycle time, invest time plus curing time, was reduced by about 20 seconds or 22%

EXAMPLE II

A production run of resin coated sand was tested at a leading Midwestern foundry. Two 22 ton batches of sand were coated under normal conditions of production, using a lake and bank sand combination of roughly 65– 70 AFS fineness. A phenol-formaldehyde novalak liquid/flake resin combination was used at a concentration of roughly 4 percent by weight based on the weight of the sand. Hexamethylenetetramine was used as the curing agent at a level of approximately 16 percent. Resorcinol was added to the mix at a level of 5 percent by weight based on the weight of the resin system to produce a modified sand batch and no resorcinol was added to the standard batch.

The standard physical properties for a resin coated sand were tested on both the standard and modified sands in the manner set forth by the American Foundryman's Society (as described in Example I). The melt point, 1-minute and 4-minute hot tensile, and the 2-minute cold tensile all checked within the specifications established for this customer's requirements. There were no outstanding differences noted. However, on testing the two materials in the foundry under normal operating conditions for a shell core making process, the following data was observed.

With all other variables held as constant as practical, the investment time of the resorcinol modified resin coated sand system was 40 seconds, as compared to 70 seconds for the unmodified sand, a reduction of 43%. The cure time of the resorcinol modified resin coated sand system was 50 seconds compared to 74 seconds for the unmodified system, a reduction of 32%. This resulted in an overall savings of 38% in using the resorcinol modified resin coated sand system over the conventional system.

EXAMPLE III

Various experiments were conducted both in the laboratory and in field tests in various foundries to analyze the effectiveness of a resorcinol modified resin coated sand system as regards it being able to invest and cure to the same thickness but more quickly at lower than normal curing temperatures. Past foundry practice has developed a working curing temperature range of from approximately 400– 700° F. The primary limiting factor on a lower curing temperature for production operations has been the time element. In that a resorcinol modified resin coated sand system has been discovered as investing and curing faster than a normal resin coated sand system, study was made to determine if the addition of resorcinol would also enable the use of lower temperatures to obtain the same results as a conventional system. The following test data is typical of observations made in numerous foundry field tests.

Sample A is a conventional resin coated sand system. One hundred pounds of 70 AFS fineness silica sand was preheated to 300° F. and added to the muller. Then 3.45 pounds of a commercially available phenol-formaldehyde novalak resin in flake form was added and mulling was continued for 90 seconds to coat the resin onto the sand. To the resin coated sand was added 0.55 pounds of an aqueous solution containing 33.3 percent hexamethylenetetramine followed after a 15 second pause with 1.81 pounds of water. Mulling and cooling were continued until the coated sand broke down to a free-flowing material. The free-flowing coated sand was discharged from the muller and designated as "Coated Sand A".

Sample A was used as the control sample. "Coated Sand B" and "Coated Sand C" were coated in the same manner as the Control Sand. However, 0.20 pounds of resorcinol was added to "Coated Sand B", and 0.40 pounds of resorcinol was added to "Coated Sand C". All three sand samples were tested in the manner prescribed by the American Foundrymen's Society (as set forth in Example I).

The following data represents the results obtained at low temperature levels.

|  | 250° F Investment | Cure |
|---|---|---|
| Coated Sand "A" | 36 seconds | 600 seconds |
| Coated Sand "B" | 22 seconds | 207 seconds |
| Coated Sand "C" | 19 seconds | 160 seconds |
|  | 300° F Investment | Cure |
| Coated Sand "A" | 28 seconds | 207 seconds |
| Coated Sand "B" | 19 seconds | 128 seconds |
| Coated Sand "C" | 18 seconds | 109 seconds |
|  | 450° F Investment | Cure |
| Coated Sand "A" | 15 seconds | 61 seconds |
| Coated Sand "B" | 15 seconds | 59 seconds |
| Coated Sand "C" | 15 seconds | 56 seconds |

At 300° F, the resin coated sand system modified with 0.20 pounds of resorcinol is 37% faster (overall cycle time) than the Control Sand, and the resin coated sand system modified with 0.40 pounds of resorcinol is 46% faster than the control sand.

At an extremely low operating temperature of 250° F, the reduction in cycle time is even more pronounced. The resin coated sand sytem modified with 0.20 pounds of resorcinol is 64% faster than the Control Sand, and the sample modified with 0.40 pounds of resorcinol is 72% faster than the Control Sand. All other physical properties were relatively comparable. As seen at 450° F the differences are considerably smaller than those observed at lower temperatures.

Another important feature of our invention, particularly in this time of energy shortage is that the resorcinol modified resin coated sand can be successfully used to produce shell molds or cores at substantially reduced energy comsumption and at substantially lower temperatures. In recent time foundries have been curtailed on natural gas usage. The following tests were run in a Foundry at a temperature of 360° F, substantially lower than the normal temperature of 450°-550° F. As the Control Sand, a regular coated sand without resorcinol added had 23 seconds invest and 45 seconds cure. As a second Control Sand a faster cycle sand that does invest and cure faster than regular sand was also used, but without resorcinol added. And 20 seconds invest and 35 seconds cure resulted. Finally 5% resorcinol was added to the same type of sand used in the second control test and resulted in 15 seconds invest and 20 seconds cure.

By running these tests at 360° F rather than the usual 450°-550° F consumption of natural gas was only about 50% at the lower temperature. This demonstrates that a foundry using the resorcinol modified sands of this invention had total cycle times as fast as those running at 450°-550° F with regular sands. Also this demonstrates that energy consumption can be reduced significantly by use of the resorcinol modified resin coated sands of our invention.

What is claimed is:

1. A composition for the shell process comprising an admixture of sand, a phenol-formaldehyde novalak resin, a curing agent for the resin and a small but effective amount of resorcinol sufficient to reduce the cycle time of the shell process.

2. The composition of claim 1, wherein the phenol-formaldehyde novalak resin is present in the composition at about 1 to about 8 percent by weight based on the weight of the sand.

3. The composition of claim 2, wherein the curing agent is present in the composition at about 5 to about 22 percent by weight based on the weight of the resin.

4. The composition of claim 1, wherein the curing agent is hexamethylenetetramine.

5. The composition of claim 3, wherein resorcinol is present in the composition at about 1 to about 10 percent by weight based on the solids weight of the resin.

6. The composition of claim 1, wherein resorcinol is present in the composition at about 1 to about 10 percent by weight based on the solids weight of the resin.

7. The composition of claim 1, wherein the resorcinol is present in the composition at about 2 ½ to about 8% by weight based on the solids weight of the resin.

8. A process for forming a shell component comprising mixing a major proportion of sand, a minor proportion of a phenol-formaldehyde novalak resin, a curing agent which makes the resin thermosetting and a small but effective amount of resorcinol, which decreases the cycle time of forming the shell component, and thereafter, placing the mixture in contact with a heated pattern to bond the sand particles together into a hardened shell component.

9. The process of claim 8, wherein the curing agent is hexamethylenetetramine, and the curing agent is present at a concentration of about 5 to about 22 percent by weight of the resin.

10. The process of claim 8, wherein the resin is present in the mixture at a concentration of about 1 to about 8 percent by weight based on the weight of the sand.

11. The process of claim 8, wherein resorcinol is present at a concentration of about 1 to about 10 percent by weight based on the solids weight of the resin.

12. The process of claim 8, wherein resorcinol is present at a concentration of about 2 ½ to about 8% by weight based on the solids weight of the resin.

* * * * *

UNITED STATES PATENT AND TRADEMARK OFFICE
CERTIFICATE OF CORRECTION

PATENT NO. : 4,089,837
DATED : May 16, 1978
INVENTOR(S) : Manfred Luttinger et al.

It is certified that error appears in the above—identified patent and that said Letters Patent is hereby corrected as shown below:

Column 1, line 54, "atuomted" should read -- automated --.

Column 2, line 50, delete "specification".

Column 2, line 60, "a" should read -- as --.

Column 3, line 2, "reactin" should read -- reaction --.

Column 3, line 32, "2 1/2/2" should read -- 2 1/2 --.

Column 4, line 4, "mintues" should read -- minutes --.

Column 5, line 12, "174" should read -- 1/4 --.

Column 5, line 68, "22%" should read -- 22.2% --.

Signed and Sealed this

Thirteenth Day of May 1980

[SEAL]

Attest:

SIDNEY A. DIAMOND

Attesting Officer     Commissioner of Patents and Trademarks